United States Patent [19]

Bowman et al.

[11] Patent Number: 4,859,848

[45] Date of Patent: Aug. 22, 1989

[54] MASS SPECTROMETER APPARATUS

[75] Inventors: Ronald R. Bowman; Ingvar E. Sodal; Thomas A. Wilke, all of Boulder, Colo.; Frank Weller, Menlo Park, Calif.

[73] Assignee: Masstron, Inc., Boulder, Colo.

[21] Appl. No.: 107,011

[22] Filed: Oct. 9, 1987

[51] Int. Cl.[4] .............................................. B01D 59/44

[52] U.S. Cl. .................................... 250/296; 250/282; 250/396 R

[58] Field of Search ............... 250/296, 294, 289, 283, 250/281, 305, 396, 282, 288, 397, 423, 356

[56] References Cited

U.S. PATENT DOCUMENTS

| | | | |
|---|---|---|---|
| 2,601,097 | 6/1952 | Crawford . | |
| 3,648,047 | 3/1972 | Bushman et al. . | |
| 3,824,390 | 7/1974 | Magyar . | |
| 4,018,241 | 4/1977 | Sodal et al. . | |
| 4,078,176 | 3/1978 | Matsuda | 250/296 |
| 4,521,687 | 6/1985 | Naito | 250/296 |
| 4,853,029 | 11/1985 | Matsuda | 250/396 R |

*Primary Examiner*—Janice A. Howell
*Assistant Examiner*—Michael Arnoff
*Attorney, Agent, or Firm*—Sheridan, Ross & McIntosh

[57] ABSTRACT

An apparatus is provided for use in determining the components of an inputted gas mixture. The apparatus includes a single piece body or framework preferably made of a high insulating material, such as ceramic. The body includes a number of cut-outs for receiving or incorporating hardware used in generating ions, controlling their movement, and directing them to an ion collector plate. One of the cut-outs formed in the insulating body receives an ion source assembly. Another of the cutouts is a passageway with metallized material coated along the walls thereof for use in generating an electric field. A third cut-out receives and is associated with a magnet assembly used in directing ion movement towards the collector plate. The single body and cut-out construction reduces the number of individual parts, improves the assembly of such parts and reduces adjustment time associated with such parts. The magnetic assembly is formed using pairs of identical parts in a sandwich-like construction to also facilitate assembly of the apparatus. The body also includes a number of feed through holes for receiving conducting pins. The locations of the holes are precisely formed in the body and the conducting pins are used in providing electrical communication between apparatus parts and control hardware.

28 Claims, 5 Drawing Sheets

MASS SPECTROMETER APPARATUS

FIELD OF THE INVENTION

The present invention relates to a mass spectrometer for determining the composition of a sample and, in particular, to an apparatus used in proportionally quantifying the constituents of a gas mixture.

BACKGROUND OF THE INVENTION

Mass spectrometers have been previously proposed or devised for identifying the components of an inputted gas sample. It is also known to utilize an ion source for the purpose of creating positive ions using the inputted gas. The positive ions are accelerated and focused before being outputted from the ion source to an analyzer assembly. This assembly typically includes a curved path along which the ions are controlled and/or directed. It is also a conventional technique to maintain a magnetic field for causing the positive ions to be directed to or turned towards an ion current collector plate against which the positive ions impinge. The collector plate is monitored by processing hardware for determining the gas constituents of the inputted gas sample based on the magnitude of the ion current. More specifically, ions of one particular gas of a gas mixture can be defined according to a unique atomic mass to charge ratio. The collector plate can be designed such that each expected gas of a known mass and charge can be identified using the ion current generated by its ions, which strike a predetermined portion of the collector plate.

Examples of mass spectrometer-related apparatus are found in U.S. Pat. No. 3,648,047 to Bushman, et al., issued Mar. 7, 1972, and entitled "Sensitivity Control For Mass Spectrometer;" U.S. Pat. No. 3,824,390 to Magyar, issued July 16, 1974, and entitled "Multi-Channel Mass Spectrometer;" and U.S. Pat. No. 2,601,097 to Crawford, issued June 17, 1952, and entitled "Mass Spectrometer For Simultaneous Multiple Gas Determinations." Additionally, U.S. Pat. No. 4,018,241 to Sodal, et al., issued Apr. 19, 1977, and entitled "Method And Inlet Control System For Controlling A Gas Flow Sample To An Evacuated Chamber," relates to servo control circuitry for use in controlling the opening and closing of a valve communicating with an ion source of a mass spectrometer apparatus.

Although the basic concepts and functions associated with mass spectrometers have been known and utilized for a number of years, drawbacks have been identified with regard to prior art mass spectrometers. With respect to the afore-described conventional mass spectrometer, major parts thereof must be accurately aligned relative to each other in order to achieve the desired objective of causing the positive ions to strike or contact a collector plate at the proper points or areas. For such prior art devices, this is a relatively difficult task inasmuch as many parts are separate pieces and must be aligned and connected together. For example, the parts of the analyzer assembly for directing the positive ions to the collector plate might be joined to the ion source assembly by means of bolts or fasteners connecting the metal housings of these two units together. Relatedly, after each of the various assemblies of the prior art mass spectrometer have been assembled, they must then be joined together and this requires a very exact precision, which can be very time consuming. There are other aspects of prior art mass spectrometers that result in complicated and time-consuming alignment. Subsequent adjustment of such parts is also required in prior art mass spectrometers, even after they were thought to be precisely aligned, in order to accomplish the simultaneous collection of one or more positive ions of different masses on the collector plate. Such adjustments also increase the assembly time. Relatedly, in the case of the electrostatic analyzer section itself, prior art mass spectrometer electrostatic analyzers are comprised of numerous parts that must be machined with high accuracy and positioned accurately relative to each other. The cost of manufacturing and assembly time is very significant.

SUMMARY OF THE INVENTION

To alleviate the aforesaid parts registration concerns and adjustments, as well as the number of separate parts, thereby reducing assembly time and improving the operation capabilities of the mass spectrometer, in addition to providing other improvements such as economically locating feed through conducting pins, an apparatus is disclosed which includes a one-piece body formed to house or incorporate mass spectrometer parts or assemblies used in ionizing an inputted fluid, such as a gas mixture, and directing ions to a collector plate. In a preferred embodiment, the body is entirely made of an insulating material, such as a ceramic. Because of the integral body construction, there are many fewer parts, there is an improved registration of parts, adjustment of parts is facilitated and feed through pins are conveniently and inexpensively located in the unitary body.

To achieve fewer parts and the desired registration of parts, a number of cut-outs are formed in the single body. In particular, the body includes a through opening used in containing an ion source assembly in which positive ions of the inputted gas mixture are produced. A passageway is also formed in the one-piece body. The passageway essentially constitutes the complete electrostatic analyzer for directing the ions for collection and subsequent analysis as it only needs to have its walls metallized, unlike the prior art where twenty or more separate parts may be required in the electrostatic analyzer. The body also includes a cavity for receiving a magnetic assembly also used to control or direct the path of the ions. In a preferred embodiment, the one-piece body also has a cutaway formed between the opening and the passageway along which an ion stream passes. This part of the integral body is connected to a pump for creating a suitable vacuum within the various chambers of the single body.

More particularly, the opening of the integral body is shaped to suitably receive the various connected parts of the ions source assembly and align it with the other parts found with the integral body. The ion source assembly includes a spring or bias unit for causing the remaining parts of the ion source assembly to be positioned against ledges or stops formed as part of the integral body construction. In this way, the ion source assembly can be simply and accurately aligned relative to the other communicating parts or assemblies of the mass spectrometer apparatus of this invention.

The electrostatic analyzer includes a passageway that is curved according to a predetermined and desired angle for properly directing the stream of ions outputted by the ion source assembly. An electric field is also generated along the length of the passageway. To generate the electric field the walls defining the passageway of the integral body are appropriately metallized by means of a thin coating made of metal. In such a manner, the electrostatic analyzer can be formed with much fewer parts and concerns relating to proper registration of parts are thereby reduced.

The single body also includes a cavity formed at the end portion thereof opposite from the opening that houses the ion source assembly. The cavity is used in containing parts of the magnetic assembly. The magnetic assembly creates a magnetic field for further directing the ions that exit from the passageway. By means of the magnetic field, the ions are caused to move towards a collector plate having a number of collectors or pads for receiving the ions. The collectors are formed on the collector plate according to a known and predetermined pattern whereby for each of a number of selected gases, a corresponding collector is provided on the collector plate. As is well known in the mass spectrometer art, the collectors are positioned relative to the other parts of the mass spectrometer such that ions of a predetermined gas will strike its associated collector, with the movement and direction of the ions being controlled using the analyzer portions of the mass spectrometer. As a result, an ion of a predetermined gas striking one of the collectors is sensed and processed to provide a determination and proportional quantification of the gas whose ion impinged upon the collector. The collector plate is held to one of the walls that defines the size of the cavity. In a preferred embodiment, the collector plate is fastened to the side wall using a number of conducting pins. A corresponding number of bore holes are formed through the section of the single body for receiving the conducting pins. Each conducting pin extends through one of the bore holes and electrically communicates with one of the collectors at its lower end and also holds the collector plate in the cavity. Each of the upper ends of the conducting pins extends sufficiently outwardly to engage or communicate with processing hardware, such as electric circuitry located on a PC card. Such feed-through conducting pins are an important aspect of the present invention inasmuch as the bore holes for receiving the pins can be precisely and economically located as desired for each mass spectrometer apparatus. The pins are also conveniently electrically isolated from each other in the preferred embodiment where the integral body is made of an insulating material.

With further regard to the magnetic assembly, it includes a pair of spaced magnetic pole pieces defining a gap therebetween. Positive ions moving in the analyzer pass into the gap to be directed to the collectors associated with those particular ions. The magnetic assembly also includes a pair of seal covers, with each of the seal covers being located outwardly of one of the pole pieces. A pair of relatively flat seal members, each having a substantially rectangular crosssection, overlie the peripheral of each of the sides of the integral body to create a very effective seal whereby the desired vacuum is maintained within the chambers of the integral body construction.

An outside cover assembly overlies the opposing longitudinal sides of the integral body. The outside cover assembly includes two pairs of separated outside covers. For each pair of outside covers, one covers or overlies about one-half of a longitudinal side of the single body. To minimize problems associated with thermal expansion involving two different, contacting materials, there are two pairs of outside covers, instead of a one piece cover. Thermal expansion concerns arise because the mass spectrometer apparatus is subjected to a high temperature after assembly and then evacuated. This heating or baking affects the metal cover parts differently than the ceramic uni-body. That is, they expand and contract to a different degree than does the uni-body. This difference is compensated for using the two pairs of covers whereby the effects of thermal expansion are reduced over using only one cover on each side of the apparatus.

Another feature relating the collection of the desired positive ions on the predetermined collectors involves the use of a masking device. The masking device is used in preventing ions from striking electrically insulating portions of the collector plate, as is well-known in the art. The masking device of this invention is positioned entirely on the outside edges of the two magnetic pole pieces. The masking device is connected to each of the two pole pieces by means of fasteners located through parts of the masking device and the pole pieces. By this arrangement, removal of the masking device is facilitated. In cases where it is necessary desired to mask other portions of the collector plate, it is a relatively easy task to remove the masking device and collector plate so that the mass spectrometer can be reconfigured for measuring a different set of gases.

In view of the foregoing summary description, a number of objectives of the present invention are seen to be realized. A unitized body construction is provided for: (a) enhancing reproducability of the body; (b) facilitating the registration of mass spectrometer parts; and (c) reducing the need to make subsequent adjustments to the mass spectrometer parts in order to achieve a properly functioning apparatus whereby manufacturing and assembly time and expense are reduced while a precise and accurate instrument is achieved. In a preferred embodiment, the single body is made of a high insulating material such as a ceramic. The single body includes a number of cut-outs formed in the body for receiving or incorporating various parts associated with generating and collecting ions. In that regard, one of the cut-outs includes an opening for suitably housing and locating an ion source assembly. Another cut-out is a curved passageway essentially forming the electrostatic analyzer, along which ions are directed using an electric field. This is an important feature since the walls of the passageway need only be metallized at their surfaces to complete construction of the electrostatic analyzer. Still yet another cut-out in the body defines the means for precisely locating a magnetic assembly. Important to the present invention, the single body is formed with a number of holes for receiving conducting pins. This feature inexpensively locates the pins at desired positions. Additionally, the magnetic assembly is arranged in a sandwich-like manner to facilitate assembly, while flat seal members enhance the maintaining of the desired vacuum in the cut-outs of the single body construction.

Additional advantages of the present invention will become readily apparent from the following discussion, when taken in conjunction with the accompanying drawings.

DETAILED DESCRIPTION OF THE INVENTION

Figure 1:
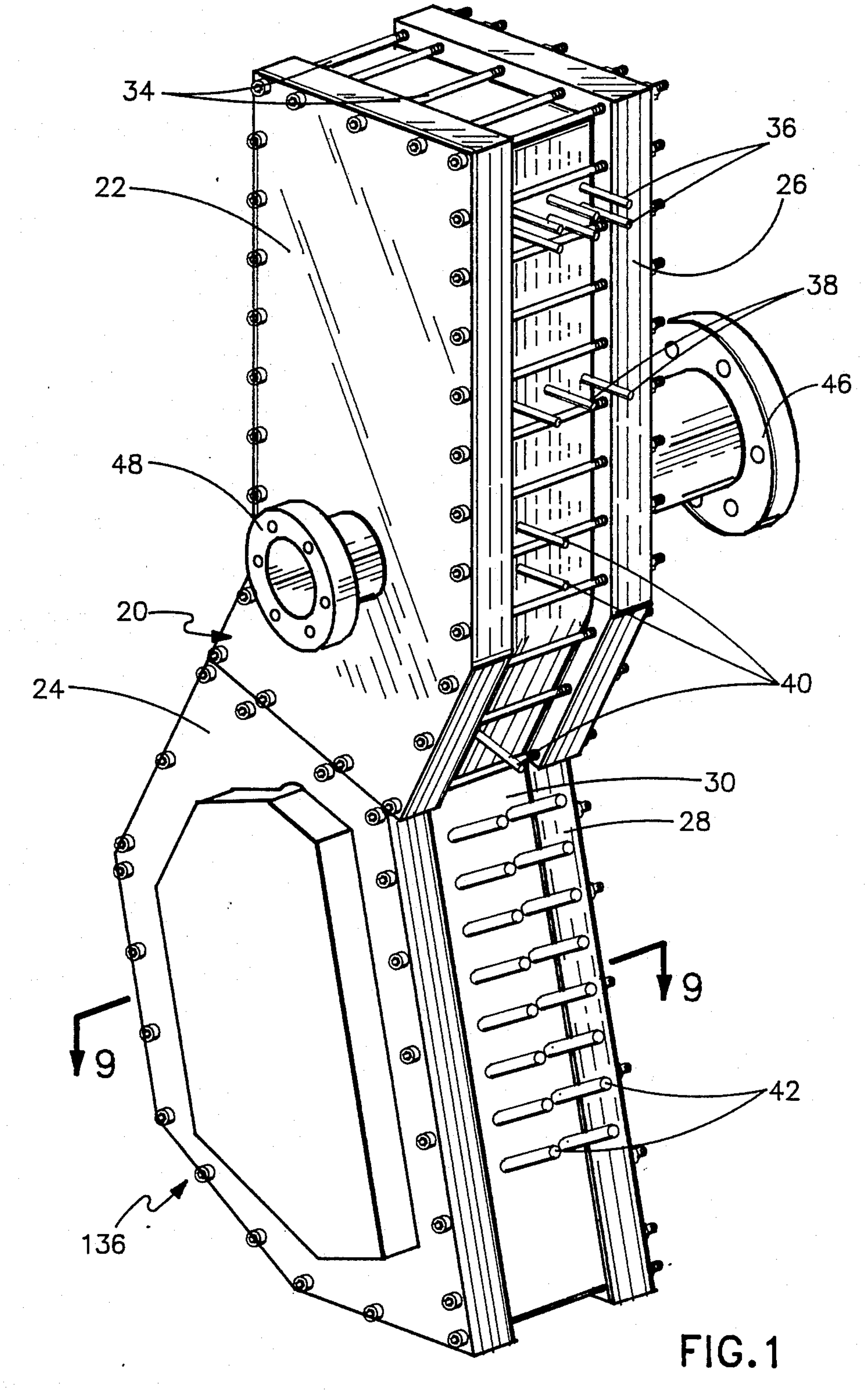
FIG. 1 is a perspective view of the mass spectrometer apparatus used in ionizing gas molecules and collecting ions for subsequent processing to determine the constituent gases of an inputted gas mixture.

In accordance with the present invention, an apparatus is provided for use in analyzing the gas constituents of an inputted gas mixture. With reference to FIG. 1, the apparatus includes a cover assembly 20 having a number of outside covers 22, 24, 26, 28. The cover assembly 20 covers or overlies the longitudinal sides of a single or one-piece body or framework 30. In the preferred embodiment, the integral body 30 is made entirely of a substantially high insulating material, such as a ceramic. The first and second outside converse 22, 24 overlie one longitudinal side of the one-piece body 30 while the other two outside covers 26, 28 overlie the opposite, longitudinal side of the body 30. The outside covers 22, 26 are attached together using a plurality of connecting bolts 34, which are located along the outer periphery of the outside covers 22–28. It is preferred that two outside covers overlie each of the two longitudinal sides because of the different thermal expansion characteristics of the outside covers 22–28 and the insulating body 30. Because of such thermal differences, thermal expansion problems are reduced by forming the longitudinal side covers in two pieces, rather than one.

Also associated with the single body 30 are a number of sets of conducting pins 36, 38, 40, 42. Each of the conducting pins is positioned through holes formed in the longitudinal edges of the body 30. The conducting pins 36–42 are used to either provide desired inputs to the assemblies of the apparatus or carry output information from the apparatus. In a preferred embodiment, the pins 36–42 are made of titanium and the body 30 is made of glass-mica because these two materials are reasonably matched in temperature coefficients. The pins 36–42 are preferably held to the body 30 by brazing. Further explanation of the conducting pins 38–42 will be provided herein in connection with a discussion of the assemblies with which they communicate.

As is well known in the mass spectrometer art, it is necessary to develop and maintain extremely low pressures within the confines of the ion generating and gas analyzing chambers. In that regard, a roughing pump fitting 46 is sealingly joined to the third outside cover 26 for use in providing communication or a passageway between a roughing pump (not shown) and the inner chambers of the apparatus. The roughing pump is used to initially create, at the factory for example, a nominal pressure in the order of $1\times10^{-5}$ torr. After this low pressure is created using the roughing pump, a smaller pump (ion pump) and fitting can be used in achieving and maintaining even lower pressures of about $1\times10^{-7}$. With reference to the first outside cover 22, anion pump fitting 48 is joined thereto for providing communication or a passageway between the ion pump (not shown) and the chambers of the apparatus. Because the apparatus of FIG. 1 is configured to greatly reduce any loss of the very low pressures created within the confines thereof, a small capacity ion pump is appropriate for maintaining the low pressures which may be lost due to even very small leaks.

Figure 2A:
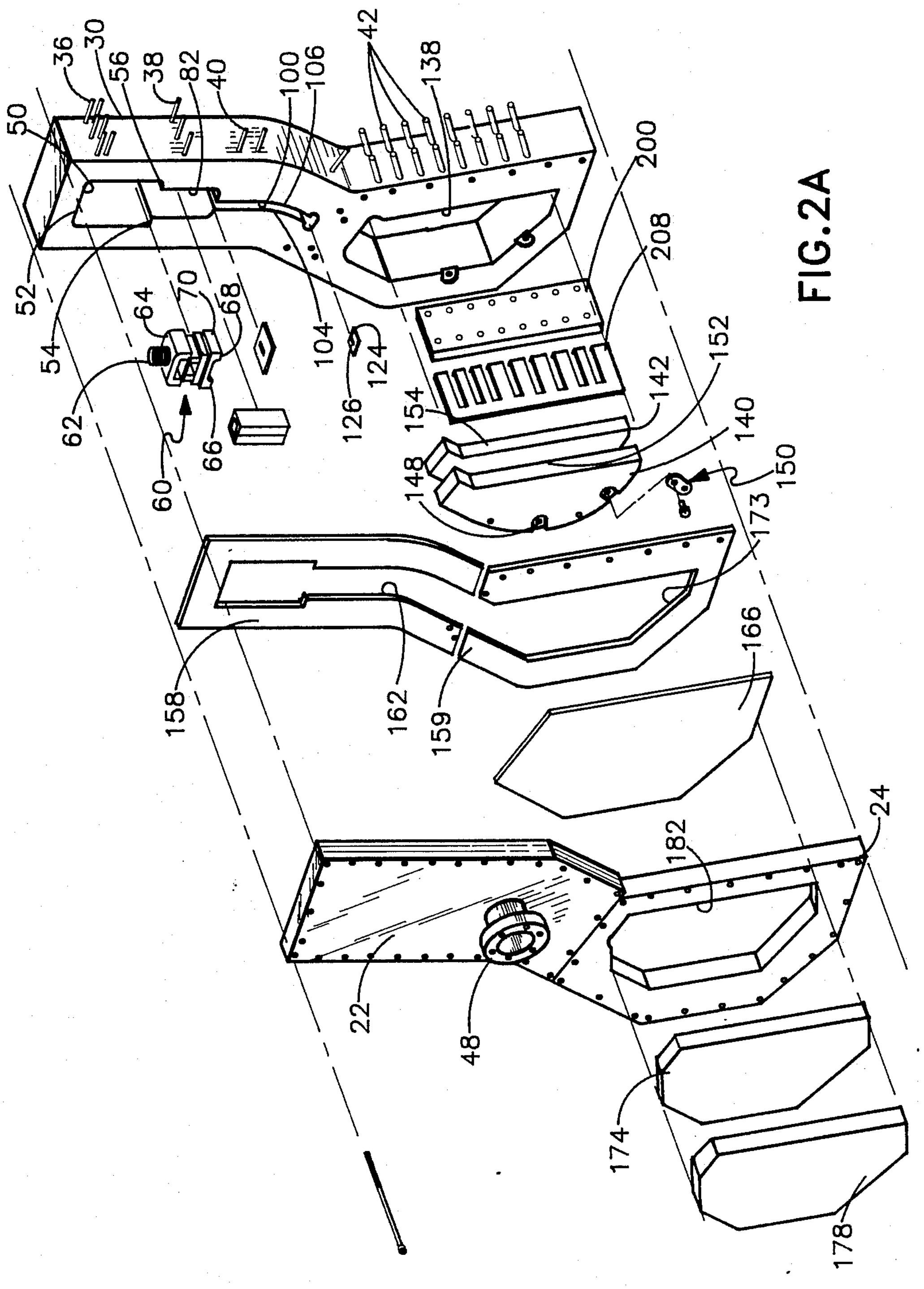
FIGS. 2A–2B are exploded views of the mass spectrometer assemblies used in ionizing gas molecules and collecting the ions.
Figure 2B:
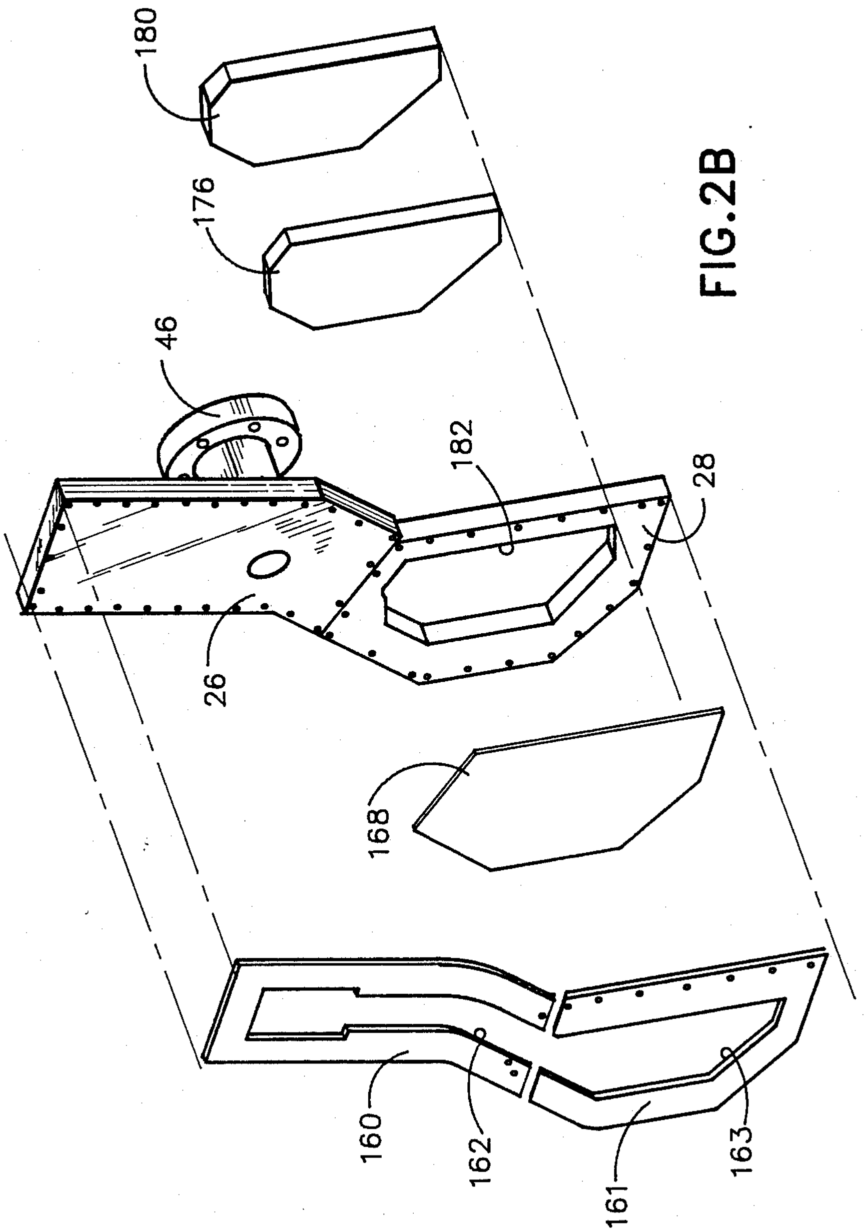
Figure 3:
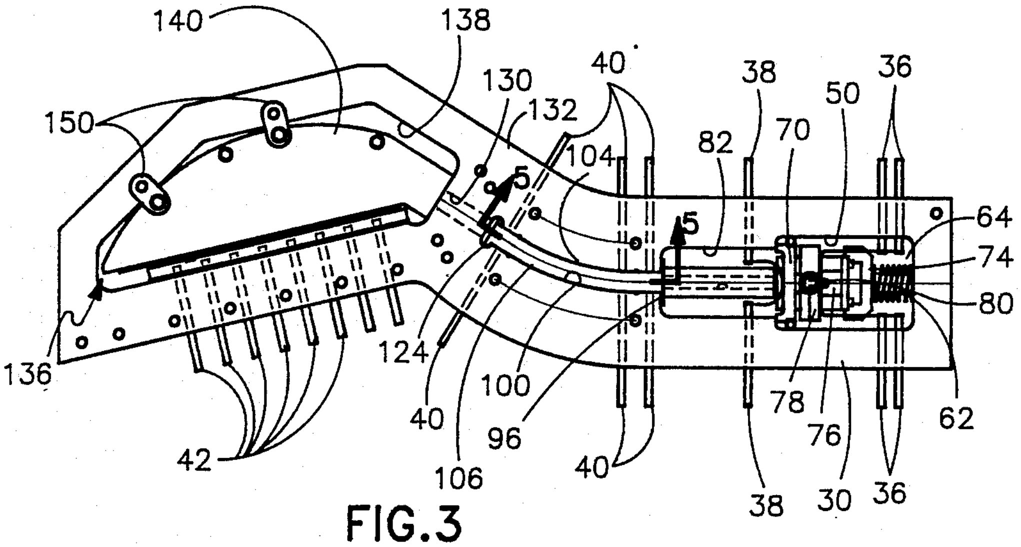
FIG. 3 is a top view of the one-piece insulating body construction illustrating the incorporation of certain mass spectrometer assemblies therein.

With reference to FIGS. 2A–2B and 3, further features and structural details relating to the one-piece body 30 will now be described. The one-piece body 30 includes a number of cut-outs formed or provided within the outside periphery or edges of the body 30. At the upper portions of the body 30, with reference to FIG. 2A, an opening 50 is formed through the insulating body construction. The opening 50 is generally rectangular-shaped and includes a wall 52 which is found at one end of the opening 50. At the opposite end of the opening 50, two ledges 54, 56 are formed and extend inwardly towards the longitudinal, center axis of the integral body 30. The opening 50 receives an ion source assembly 60, which includes a spring 62. One end of the spring 62 contacts the wall 52 while the other end of the spring 62 contacts an insulating member or plate 64. The spring 62 acts to push the remaining parts of the ion source assembly 50 so that feet or bosses 66, 68 engage or contact the ledges 54, 56, respectively, of the body 30. The bosses 66, 68 are integral with a rear support plate 70 located at the opposite end of the ion source assembly 60 from the insulating plate 64. Because of the placement and formation of the ledges 54, 56, together with the opening 50 itself, assembly and alignment of the ion source assembly 60 relative to the single piece or framework 30 is facilitated and enhanced. The ion source assembly 60 also includes a front support plate 74 abutting the insulating member 64. The front support plate 74 is connected to an ion chamber 76 through which gas molecules flow. A magnet assembly 78 is located about portions of the ion chamber 76 for use in controlling electronic emission generated by a filament.

In the preferred embodiment of the invention, the ion source assembly 60 generates positive ions by bombarding gas molecules that are supplied to the ion source assembly 60. Generally, the assembly 60 is a Nier-type ion source and variously and similarly configured known ion source assemblies can be used as part of the present invention. A gas inlet 80 of the ion source assembly 60 communicates with a value member (not shown) adapted to supply gas at molecular flow to the ion chamber 76 of the ion source assembly 60. A preferred valve member and actuator-related assembly therefor is disclosed in U.S. Pat. No. 4,560,871 issued Dec. 24, 1985, entitled "Actuator For Control Valves And Related Systems", and assigned to the same assignee as the present application.

As previously mentioned, body portions of the integral body 30 used to define the opening 50 are also formed with feed through holes for receiving conducting pins 36. In one embodiment, there are twelve conducting pins 36 associated with the ion source assembly 60, with six of the conducting pins 36 being located on one longitudinal edge of the body 30 while the other six conducting pins 36 are located on the opposite edge of the body 30. The conducting pins 36 arc to supply the necessary voltages for the functions such as electrostatic focusing and accelerating of the ion beam.

Figure 4:
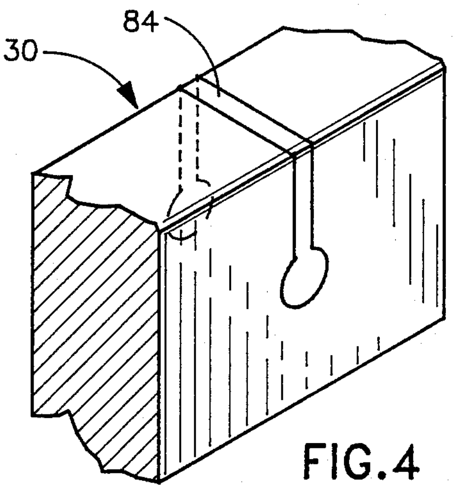
FIG. 4 is a enlarged, fragmentary section of part of the uni-body illustrating the use of a strip of conducting material to provide electrical communication between inside and outside portions of the mass spectrometer apparatus.

In another embodiment, instead of conducting pins, very thin strips or layers of conducting material 84 are provided on the outer surface of the ceramic body 30, as illustrated in FIG. 4. Each conducting channel 84 continuously extends between outward and inward portions of the body 30. The layers 84 must not be so thick as to interfere with proper sealing and connection of mass spectrometer parts.

With reference back to FIGS. 2A–2B and 3 and with regard to the remaining body portions of the integral body 30, such as used in directing and carrying the positive ions for subsequent analysis. In the preferred embodiment, the analyzing-related sections include a cut-away 82 formed in portions of the integral body 30 in communication with the opening 50. The cut-away 82 is roughly formed or manufactured to provide a free and open coupling section for the roughing pump fitting 46 and the ion pump fitting 48 to the apparatus. The reduced pressure needed inside the body 30 is desirably achieved by providing these two fittings 46, 48 at this section of the integral body 30. The pumps are attached at these locations so that the desired pressures can be created and maintained inside the body 30. In this embodiment, the pressure in the ion chamber 76 is many times greater than the pressure in the remainder of the apparatus including the cut-away 82. Such a pressure difference is due to the fact that the inputted gas or fluid is at a relatively higher pressure when it is drawn into the ion chamber 76 and because the ion source assembly 60 has a small exit aperture commmunication with the remaining parts of the apparatus. Like the body portions of the integral body 30 associated with the ion source assembly 60, there are conducting pins 38 associated with this section of the apparatus.

Figure 6:
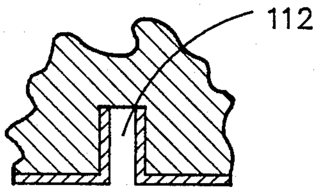
FIG. 6 is an enlarged fragmentary sectional view of one of the notches of the electrostatic analyzer, taken along lines 6—6 of FIG. 5, illustrating the metallized side walls thereof.
Figure 5:
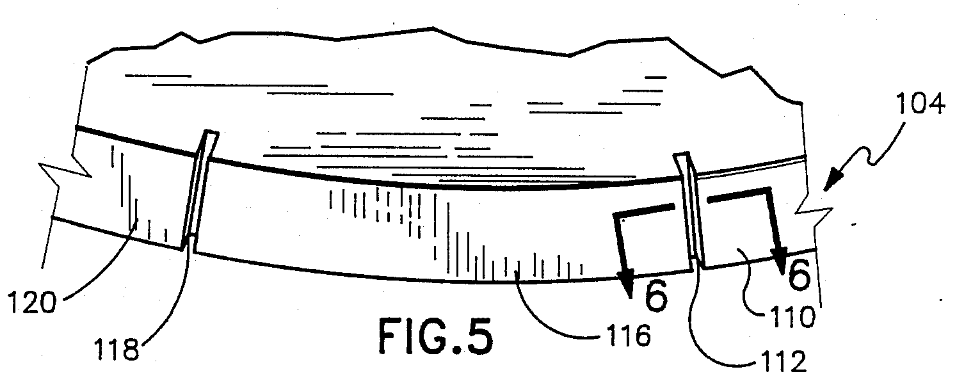
FIG. 5 is a longitudinal cross-sectional view, taken along lines 5—5 of FIG. 3, showing insulating and conducting portions of the electrostatic analyzer.

As previously noted, the cut-away 82 communicates with the passageway 100, which is a through opening in the body 30 and forms a part of the next portions of the analyzer section of the body 30. This part of the body 30 is known as an electrostatic analyzer. The passageway 100 of the electrostatic analyzer is defined by means of a pair of spaced, longitudinally extending sidewalls 104, 106. As best seen in FIG. 5, major portions of the sidewalls 104, 106 are coated or overlaid with a metal material to define three sets of opposing plates or electrically conducting media in the passageway 100. One of each of the three sets of opposing plates is illustrated in FIG. 5, with the other ones of the opposing plates being of the same construction and being provided on the opposing wall. As can be seen in FIG. 5, a first shunt plate 110 of metal material is provided adjacent to the cut-away 82. The plate 110 extends for a relatively short distance along the longitudinal extent of the passageway 100 (in a leftward direction with reference to FIG. 5). The shunt plate 110 terminates with the absence of metallized material. Specifically, at the end of the shunt plate 110 illustrated in FIG. 5, the shunt plate 110 extends to notch 112. As seen in FIG. 6, the notch 112 has a depth into the body 30 defining two side walls and a back wall. Metallization is provided along the side walls while the back wall remains free of metallization and defines an insulating area. The insulating area is provided to electrically isolate the shunt plate 110 from an electric field plate 116. The electric field plate 116 extends for a substantial length of the passageway 100 and it is also formed by providing a metallized coating over the sidewall portions of the insulating body 30. The electric field plate 116 extends to a notch 118, which is like notch 112 having no metal coating at its back wall, and which back wall is part of or integral with the body 30. At the opposite end of the passageway 100, adjacent to notch 118, a second shunt plate 120 is provided. The plate 120 is also formed using a metal coating over the insulating material which comprises the one-piece body 30. The second shunt plate 120 extends longitudinally to a Z-axis plate 124, which extends laterally across the end of the passageway 100. The Z-axis plate 124 has a slit 126 for limiting the escape of ions from the passageway 100. In accomplishing this, the slit 126 limits the height of the ion stream (perpendicular to the plane of FIG. 3). Consequently, an ion stream of a desired height exits the passageway 100 into the next portion of the analyzing portion of the one-piece body construction 30.

With regard to the opposing electric field plates 116, an electric field is created therebetween by applying a negative voltage to the plate 116 on the sidewall 104 and a positive voltage to the plate 116 on the sidewall 106. In one embodiment, the negative applied voltage is about −40 volts and the positive applied voltage is about +40 volts. To apply the necessary voltages to the plates 116, two of the conducting pins 40 associated with the electrostatic analyzer section of the integral body 30 are utilized. The first and second pairs of shunt plates 110, 120 act as shunts to minimize electric field protrusion beyond electric field plates 116. To achieve this purpose, pairs of conducting pins 40 hold the plates 110, 120 at zero voltage potential. In forming the notches 112, 118, a metal tool is used to cut slits from a metal strip thereby producing notches having a suitable size and location.

As is well-known in the mass spectrometer art, at least substantial portions of the passageway 100 must be curved to and in the precise focusing of the ion beam. In the embodiment of this invention, the electric field plates 116 are curved through an angle of about 31° 50″. As the positive ions move past the electric field plates 116 through the passageway 100, they curve away from the electric field plate associated with the sidewall 104 towards the electric field plate 116 associated with the sidewall 106. Such an electric field and amount of curvature causes the positive ions to align in separate but substantially parallel paths for passage through the slit 126 formed in the Z-axis plate 124.

The substantially parallel streams of positive ions outputted from the slit 126 pass through a tunnel 130 formed through a part of the integral body 30 identified as a bridge 132. The tunnel 130 is a bore formed through the thickness of the one-piece body construction 30 and has a diameter of about 0.312 inches. The distance defined along the longitudinal extent of the integral body 30, which comprises the bridge 132, is sufficient to adequately support the ends of the contiguously adjacent first and second outside covers 22, 24 and the third and fourth outside covers 26, 28 of the outside cover assembly 20.

Figure 9:
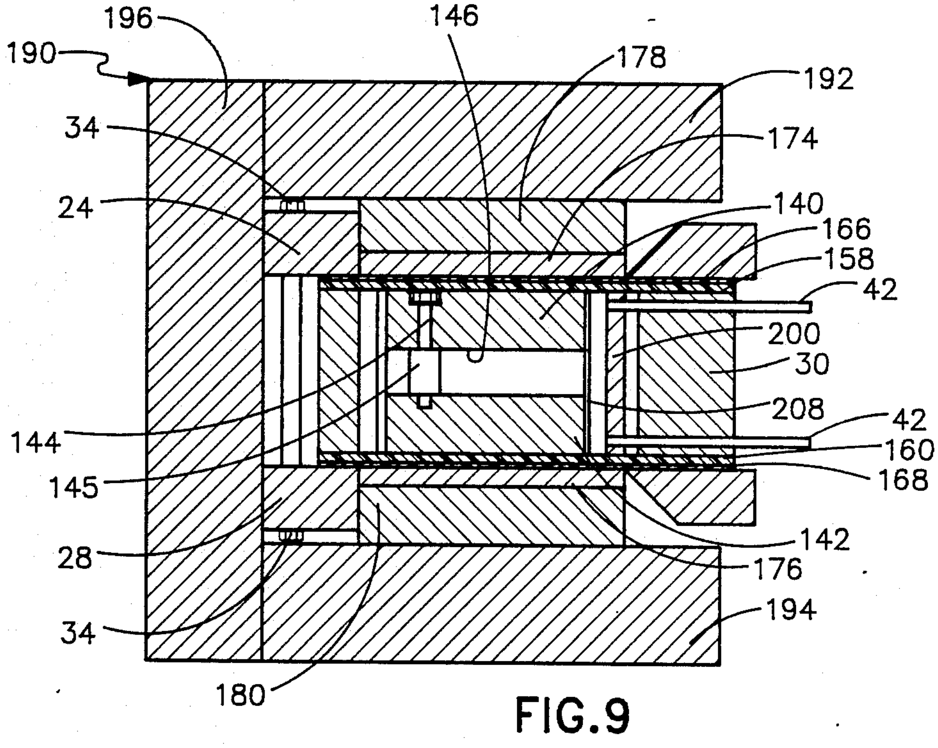
FIG. 9 is a lateral cross-sectional view, taken along lines 9—9 of FIG. 1, showing the inter-relationship among various parts of the magnetic assembly and also adding the yoke.

The positive ions outputted from the tunnel 130 are received by another integral analyzer section or body portions of the apparatus. In particular, the positive ions pass to a magnet assembly 136. The magnet assembly 136 is intended to provide a uniform magnetic field for further directing the received positive ions for collection and analysis by processing hardware. With particular reference to FIGS. 2A–2B and 9, the integral body 30 has a cavity 138 formed therein and which communicates with the tunnel 130. Parts of the magnet assembly 136 are held in the cavity 138, while other parts thereof extend outwardly therefrom, as will be subsequently explained. Preferably, the magnet assembly 136 is formed by means of a "sandwich" construction wherein identical parts are provided on opposite longitudinal sides of the body 30 and connected together in a sandwich-like fashion.

The magnet assembly 136 includes a first pole piece 140 and a second pole piece 142. As best seen in FIG. 9, the two pole pieces 140, 142 are joined together by a fastener 144 and held apart by a spacer 145 to define a gap 146 therebetween. As seen in FIG. 2A, each of the two pole pieces 140, 142 is of a size to be received by and held in the cavity 138 of the body 30. Each of the first pole pieces 140, 142 has recesses 148 having holes for attaching the first and second pole pieces 140, 142 to portions of the body 30 using connectors 150. As can be appreciated, holes are preformed in such body portions and with the holes precisely determined in the pole pieces 140, 142, the pole pieces 140, 142 can be accurately positioned and aligned in the cavity 138, shown in FIG. 3. Each of the two pole pieces 140, 142 is made of magnetic material, but they are not permanent magnets. It is important that a uniform magnetic field be established in the gap 146 using such pole pieces 10, 142. Consequently, such pole pieces 140, 142 must be machined to provide flat and highly parallel surfaces particularly along facing surfaces 152, 154, illustrated in FIG. 2A, of pole pieces 140, 142, respectively.

With reference also to FIGS. 2A–2B, the next outwardly-located part of the sandwich-like construction are pairs of seal members. A first pair of seal members 158, 159 is located adjacent to the pole piece 140 and a second pair of seal members 160, 161 is located adjacent to the pole piece 142. Although not directly involved in generating the magnetic field, the seal members 158–161 are important in maintaining the very low pressures developed in the chambers of the uni-body construction 30 and preventing any leakage between outside pressures, atmospheric or otherwise, and inside pressures developed within the body 30. Each of the two seal members 158, 160 has an opening 162 in which portions thereof have longitudinal and lateral dimensions at least equal to or greater than those of the opening 50, cutaway 82, and passageway 100. Each of the two seal members 159, 161 has an opening 163 in which portions thereof have longitudinal and lateral dimensions greater than those of the cavity 138. Each of the seal members 158–161 overlies longitudinal side portions of the integral body 30 at the periphery thereof. It is also necessary that the seal members 158–161 have the ability to expand and contract without loss of the sealing effect.

With reference also again to FIGS. 2A–2B, in connection with achieving the desired sealing, a pair of seal covers 166, 168 are also provided. Each of the two seal covers 166, 168 is dimensioned to overlie the openings 163 of the seal members 159, 161, respectively, so that the cavity 138 is properly covered to achieve a suitable seal. The seal covers 166, 168 are made of a very thin non-magnetic metal, with the objective being to make the seal covers 166, 168 as thin as practically possible to minimize any effects on the magnetic circuit while still providing the necessary sealing.

Outwardly adjacent relative to the seal covers 166, 168 are iron faces 174, 176. The iron faces 174, 176 are also part of the magnetic circuit of the magnet assembly 136. The first iron face 174 overlies the first seal cover 166 and the second iron face 176, on the opposing longitudinal side of the integral body 30, overlies the second seal cover 168. The iron faces 174, 176 are made of a magnetic material similar to that of the material from which the pole pieces 140, 142 are made. Each of the two iron faces 174, 176 has a number of holes drilled therethrough for attachment purposes. A primary purpose of the iron faces 174, 176 is to provide a means for interconnecting permanent magnets to an outer yoke, as will be further explained later herein.

Figure 8:
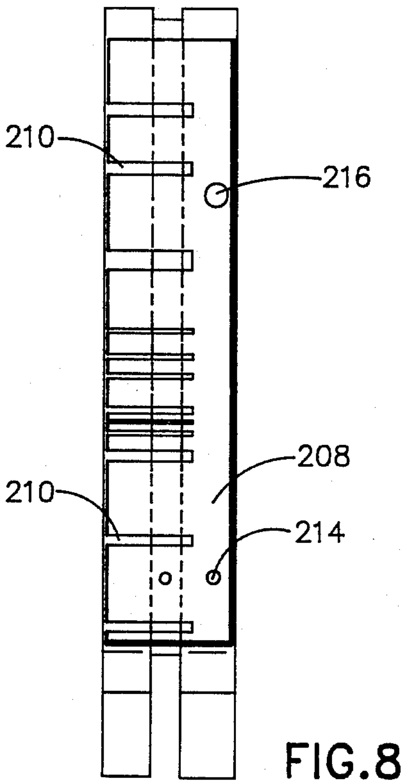
FIG. 8 is a top plan view of the masking device illustrating the slits thereof through which ions are able to pass to the collectors of the collector plate.

Also part of the magnetic circuit and located outwardly of the iron faces 174, 176, are permanent magnets 178, 180. The first permanent magnet 178 overlies the iron face 174 and the second permanent magnet 180 overlies the second iron face 176. The permanent magnets 178, 180 and the iron faces 174, 176 are comparable in size and are dimensioned to be received within the open area 182, defined in each of the second and fourth outer covers 24, 28. As seen in FIGS. 1 and 8, the permanent magnets 178, 180 extend outwardly beyond the second and fourth outer covers 24, 28. Each of the two permanent magnets 178, 180 is made of a material for permanently generating magnetic fields. The permanent magnets 178, 180 are held between their adjacent iron faces 174, 176 respectively, and a yoke 190. As seen in FIG. 9, the yoke 190 includes a pair of yoke legs 192, 194 and a yoke riser 196, which interconnects the two yoke legs 192, 194 and is perpendicular thereto. The yoke 190 defines the outermost part of the magnetic assembly 136 and acts to channel the lines of magnetic flux between the two permanent magnets 178, 180. This results in a stronger magnetic field being produced in the air gap 146 between the pole pieces 140, 142.

As can be appreciated from the foregoing, because of the sandwich-like construction of the magnetic circuit-related parts and the intertwined sealing parts, alignment and assembly of such parts is facilitated and enhanced. Consequently, alignment and assembly time is reduced.

Figure 7:
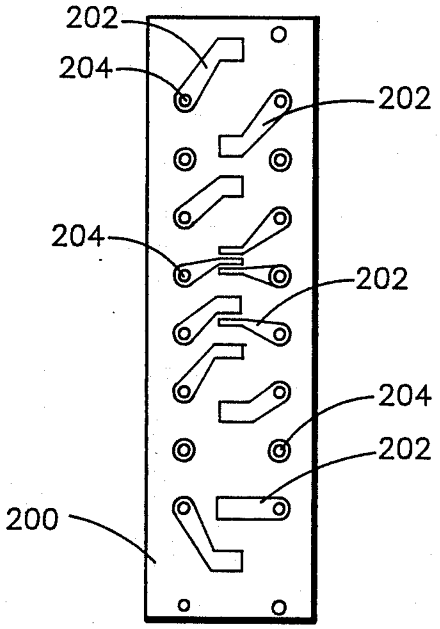
FIG. 7 is a top plan view of the collector plate showing the collectors.

As previously noted, the magnetic field in the gap 146 acts to control and direct movement of the positive ions exiting the tunnel 130. The movement of the ions is directed towards a collector plate 200. With reference to FIGS. 2A, 7 and 9, the collector plate 200 is a substantially flat, rectangular plate having a number of collectors or pads 202 that are located on the side or face of the collector plate 200 facing the air gap 146. The collectors 202 are conducting portions, which are positioned at predetermined locations along the length of the collector plate 200. The predetermined locations of the collectors 202 correspond to the areas or locations which are expected to be contacted by positive ions of the sample fluid or gas mixture being inputted to the apparatus. As is well-known in the mass spectrometer art, the collectors 202 are made of a conducting material and the locations thereof can be predetermined, upon identifying the expected gases to be received by the apparatus. For example, in the case of monitoring the breathing of a patient, the respiratory gases are known and the collectors 202 can be designed and located for use in determining the constituents of the gas mixture exhaled by a patient to the mass spectrometer having the apparatus of the present invention. The side of the collector plate 200 opposite that having the collectors 202 is attached to the integral body 30 along one of the walls defining the cavity 138. This is accomplished using the conducting pins 42. Holes are formed or drilled through the integral body 30 at predetermined locations. The conducting pins 42 are inserted into the holes, with the tips of the conducting pins 42 extending through the body 30 into the cavity 138 for connection to the collector plate 200 at the pin connection points 204, which pin connection points are illustrated in FIG. 7. Sixteen conducting pins 42 are illustrated in this embodiment and as seen in FIG. 7, only twelve of the conducting pins 42 are being utilized in communication with collectors 202. As can be appreciated, all sixteen of the pin connection points 204 could be utilized and even more than sixteen conducting pins 42 and collectors 202 could be utilized. It is only necessary that any expected gas ion, having an associated collector 202, have an atomic mass and charge which permits the expected gas ion to be directed to and strike some point or area along the length of the collector plate 200, which area defines a collector 202.

As with the other conducting pins, making the integral body 30 from an insulating material results in appropriate electrical insulation among the various conducting pins 42, without the need to incorporate further insulating material. Consequently, a reduced number of parts is required. Further, because of the conducting pin and insulating body construction, loss of the vacuum or low operating pressures within the integral body 30 due to leakage through the holes receiving the conducting pins 42 is reduced since an additional sleeve of insulating material is not required, as is the case in which the assembly housing or body is made of a conducting material. Further, the feed through holes for receiving the conducting pins 42 can be precisely located when the body 30 is machined. In addition to providing desired contact with the pin connections 204 of the collector plate 200, the opposite ends of the conducting pins 42 can be easily electrically connected to processing hardware circuitry, such as a printed circuit card, to facilitate connection and removal of the card from the conducting pins 42.

The construction of the ion collector portions of the apparatus also enhance alignment and assembly procedures. Both the holes formed in the body 30 for receiving the conducting pins 42 and the pin connection points 204 of the collector plate 200 can be precisely located. It becomes only a matter then of aligning such connection points 204 with the conducting pins 42 received through the holes to properly register the collector plate 200 relative to the integral body 30.

In conjunction with the collection of positive ions by the collectors 202, a masking device 208 is employed. The masking device 208 is devised to permit expected positive ions to strike or impinge upon collectors 202 and not electrically insulating portions of the collector plate 200. The use of such masking devices is well-known in the mass spectrometry field. With reference to FIGS. 2A, 8 and 9, the masking device 208 includes a number of vertical slits 210, which are formed at predetermined locations along the longitudinal extent of the masking device 208. As illustrated best in FIG. 9, the masking device 208 is connected to each of the two pole pieces 140, 142 and spaced from the collector plate 200. With regard to the connection of the masking device 208 to the pole pieces 1, 142, the masking device 208 is conveniently located outwardly of the pole pieces 140, 142 and the gap 146. This is accomplished by connecting the masking device 208 to the side edges 152, 154 of the respective pole pieces 104, 142. With reference to FIG. 8, a fixed connection point 214 and a floating connection point 216 are utilized to fasten the masking device 208 to the side edges 152, 154. At the fixed connection point 214, a tight connection is provided between the pole pieces 140, 142 and the masking device 208. At the floating connection point 216, a slight looseness is maintained between the masking device 208 and the pole pieces 104, 142, This looser connection is important to avoid thermal expansion problems due to the different thermal expansion characteristics of the pole pieces 140, 142 and the masking device 208.

The non-slitted areas of the masking device 208 prevent communication between the air gap 146 and the collector plate 200. Consequently, such non-communicating areas of the masking device 208 block positive ions except those of an expected mass and charge. The masking device 208 is made of a non-magnetic material since it is connected directly to each of the pole pieces 140, 142. The positive ions that pass through the vertical slits 210 of the masking device 208 impinge upon associated collectors 202 and cause a current to flow from each of the struck collectors 202 through a corresponding conducting pin 42 to the processing hardware electrically connected to the conducting pins 42. Like other parts of the apparatus, the masking device 208 can be made with the predetermined locations for the slits 210 and with the fixed connection point 214 and floating connection point 216 precisely located. The holes formed in the side edges 152. 154 of the pole pieces 140, 142 are also precisely drilled so that proper and facilitated registration between the fixed connection point 214 and floating connection point 216 of the masking device 208 and such holes is readily achieved.

It is also preferred in the present invention that the circumferential sides of the integral body 30, except for the areas between the conducting pins 36–42, be metallized. In particular, a thin layer of metal coating is provided about the circumferential sides. The longitudinal sides are metallized already by means of the outer cover assembly 20. Such substantial shielding serves to protect the apparatus from electric fields generated outside thereof. As can be appreciated, such metal coating is not necessary in prior art systems in which the parts are not made of a substantially insulating material.

It should be understood that, although the preferred uni-body is made of a high insulating material, another embodiment of the present invention includes an integral conducting metallic body or the like in which insulating layers or pieces are coated or affixed to the metallic uni-body. In such an embodiment, for example, the electrostatic analyzer section is appropriately coated with insulating material at predetermined locations and the feed through holes for receiving conducting pins would be encased in a layer of insulating material.

In view of the foregoing discussion of the present invention, a number of advantages thereof are immediately recognized. In connection with generating positive ions for collection and subsequent analysis, a one-piece body is provided. The integral body improves registration of the parts required for ion generation and collection for subsequent analysis and thereby reduces assembly and adjustment time of the parts that are received or incorporated with the integral body. Additionally, much fewer individual parts are utilized. In developing the necessary electric field along the curved passageway of the electrostatic analyzer, it is not necessary to employ separate, interconnected parts. The electric field is terminated in a desirable way using shunt plates. Preferably, this is best accomplished by metallizing walls made of a high insulating material and which define the curved passageway. Importantly, the single body readily lends itself to conveniently locating feed through holes and also precisely locating such holes when that is necessary or desirable. This construction reduces the cost of manufacture and assembly of the apparatus while still providing a high quality and properly functional mass spectrometer. This pin construction is also convenient for providing the necessary electrical connections and each pin is easily sealed in its feed through hole whereby there are no gas leakage paths between the outside environment and the inside of the apparatus.

The foregoing discussion of the invention, including any variation of the preferred embodiments, has been presented for purposes of illustration and description. It is not intended that any such embodiment be exhaustive or in any way limit the invention to the precise form disclosed, and other modifications and variations may be possible in light of the above teachings. It is intended that the appended claims be construed to include other alternative embodiments of the invention except insofar as limited by the prior art.

What is claimed is:

1. A mass spectrometer apparatus, comprising:

first means for generating ions using a molecular fluid, said first means including a first means body portion;

second means for generating magnetic and electric fields, said second means communicating with said first means and said second means including a second means body portion, said first means body portion and said second means body portion being integral and contiguously adjacent to each other, with said first means body portion and said second means body portion being substantially formed of a first material, wherein portions of said first material are covered with a second material in which said first material has insulating properties and said second material has electrical conducting properties; and third means operatively associated with said second means for use in determining components of the fluid.

2. An apparatus, as claimed in claim 1, wherein said first means includes:

ion source means including an ion source assembly, said first means body portion including an opening for receiving substantial portions of said ion source assembly.

3. An apparatus, as claimed in claim 2, wherein said first means body portion includes:

a cut-away formed in said first means body portion, said cut-away being contiguously adjacent to said opening.

4. An apparatus, as claimed in claim 2, wherein:

said first means body portion includes first cooperating means located at an edge of said opening and said ion source assembly includes second cooperating means positioned in said opening, said second cooperating means contacting said first cooperating means to locate said ion source assembly in said opening.

5. An apparatus, as claimed in claim 2, wherein:

said ion source means includes plate means and biasing means, said biasing means engaging said plate means for use in positioning said ion source means in said opening of said first means body portion.

6. An apparatus, as claimed in claim 1, wherein:

said second means includes electrostatic analyzing means having passageway means and a first electric field generating means and a second electric field generating means, said first electric field generating means being spaced from said second electric field generating means by said passageway means, said first electric field generating means and said second electric field generating means each including a conducting plate provided on parts of said second means body portion defining said passageway means.

7. An apparatus, as claimed in claim 6, wherein:

said electrostatic analyzing means includes a first shunt means, said first shunt means being electrically insulated from said first and second electric field generating means.

8. An apparatus, as claimed in claim 7, wherein:

said electrostatic analyzing means includes a second shunt means spaced from said first shunt means and being electrically insulated from said first and second electric field generating means.

9. An apparatus, as claimed in claim 8, wherein:

said electrostatic analyzing means includes bridge means having tunnel means aligned with said passageway means, said bridge means including substantially imperforate exterior surfaces with said tunnel means being located between said exterior surfaces.

10. An apparatus, as claimed in claim 1, wherein:

said second means body portion has cavity means found therein.

11. An apparatus, as claimed in claim 10, wherein:

said second means body portion includes a plurality of holes communicating with said cavity means.

12. An apparatus, as claimed in claim 11, wherein:

said third means includes a plurality of conducting pins, one of said conducting pins being located in each of said plurality of holes.

13. An apparatus, as claimed in claim 12, wherein:

said third means includes collector means wherein at least portions of said collector means electrically communicates with at least one of said plurality of said conducting pins and said collector means is fixedly attached to said plurality of conducting pins.

14. An apparatus, as claimed in claim 10, wherein:

said second means body portion has at least one channel of conducting material extending adjacent to said cavity means to an outside surface of said second means body portion.

15. An apparatus, as claimed in claim 1, wherein said second means includes:

cavity means formed in said second means body portion;

a first pole piece;

a second pole piece spaced from said first pole piece;

a gap defined between said spaced first and second pole pieces; and means attached to said second means body portion and connected to at least one of said first and second pole pieces for connecting said first and second pole pieces to said second means body portion.

16. An apparatus, as claimed in claim 15, wherein:

said third means includes mask means and each of said first and second pole pieces includes a side edge surface, said mask means being connected to and overlying said side edge surfaces of each of said first and second pole pieces.

17. An apparatus, as claimed in claim 15, wherein said second means includes:

cover means located outwardly of said first and second pole pieces, said cover means including a first outside cover and a first seal member, said first outside cover having an outer periphery for overlying a first part of said second means body portion.

18. An apparatus, as claimed in claim 17, wherein:

said cover means includes a second outside cover and a second sealing member, said second outside cover being positioned to overlie a second part of said second means body portion.

19. An apparatus, as claimed in claim 18, wherein:

said second means includes a first magnet means located adjacent to said first part of said second means body portion and a second magnet means located adjacent to said second part of said second means body portion.

20. An apparatus, as claimed in claim 19, wherein:

said second means includes yoke means positioned outwardly of said first and second magnet means.

21. An apparatus, as claimed in claim 20, wherein said first magnet means includes:

an iron face; and a permanent magnet, said permanent magnet being located between said iron face and said yoke means.

22. A mass spectrometer apparatus, comprising:

a single body including an opening, passageway means and cavity means;

an ion source assembly for generating ions, at least substantial portions thereof being positioned in said opening;

electric field generating means being provided adjacent to said passageway means, said passageway means being located downstream relative to said opening for receiving ions generated by said ion source assembly;

magnetic means for generating a magnetic field, at least portions thereof being positioned in said cavity means, said cavity means being located downstream of said passageway means for receiving ions generated by said ion source assembly; and means for determining components of a sample using ions received by said magnetic means.

23. An apparatus, as claimed in claim 22, wherein:

said single body consists essentially of an insulating material.

24. An apparatus, as claimed in claim 22, wherein:

said single body includes a first exterior surface and a second exterior surface with first and second outer covers being connected to said first exterior surface, said first and second outer covers being separate from each other but being in substantially contiguous alignment along at least one face of each of said first and second outer covers.

25. A mass spectrometer apparatus, comprising:

first means for generating ions using a molecular fluid, said first means including a first means body portion;

second means for generating magnetic and electric fields, said second means communicating with said first means, and said second means including a body portion, said first means body portion and said second means body portion being integral and being contiguously adjacent to each other, said second means body portion having a number of holes formed therein in a predetermined manner, and said second means further including a plurality of conducting pins wherein one of said conducting pins is sealingly positioned in each one of said holes, said conducting pins being used to provide inputs to or receive outputs from said second means including applying at least one voltage to said second means; and third means including a third means body portion operatively associated with said second means for use in determining components of the fluid.

26. An apparatus, as claimed in claim 25, wherein:

said third means includes collector means having conducting pads, said third means also including a plurality of conducting pins with at least one of said conducting pins of said third means being in electrical communication with at least one of said conducting pads.

27. An apparatus, as claimed in claim 26, wherein:

ends of said conducting pins of said third means extend through said third means body portion and connect said collector means to said third means body portion, said conducting pins are connected to processing hardware circuitry for receiving information using said conducting pads.

28. A mass spectrometer apparatus, comprising:

first means for generating ions using a molecular fluid, said first means including a first means body portion;

second means for generating magnetic and electric fields, said second means communicating with said first means and including a second means body portion, said first means body portion and said second means body portion being integral and being substantially formed of a first material with said first means body portion and said second means body portion being contiguously adjacent to each other, wherein portions of said first material are covered with a second material in which said second material has insulating properties and said first material has electrical conducting properties; and third means operatively associated with said second means for use in determining components of the fluid.

* * * * *